Sept. 27, 1932.  G. H. WALKER  1,879,721
APPARATUS FOR TESTING THE BRAKES OF VEHICLES
Filed Sept. 22, 1931   5 Sheets-Sheet 1
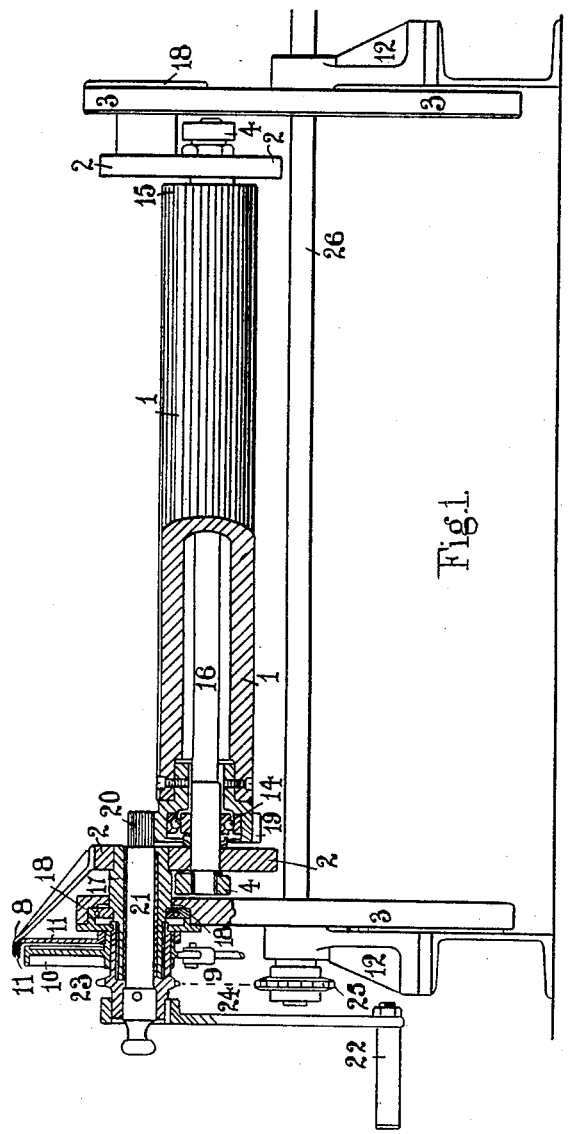
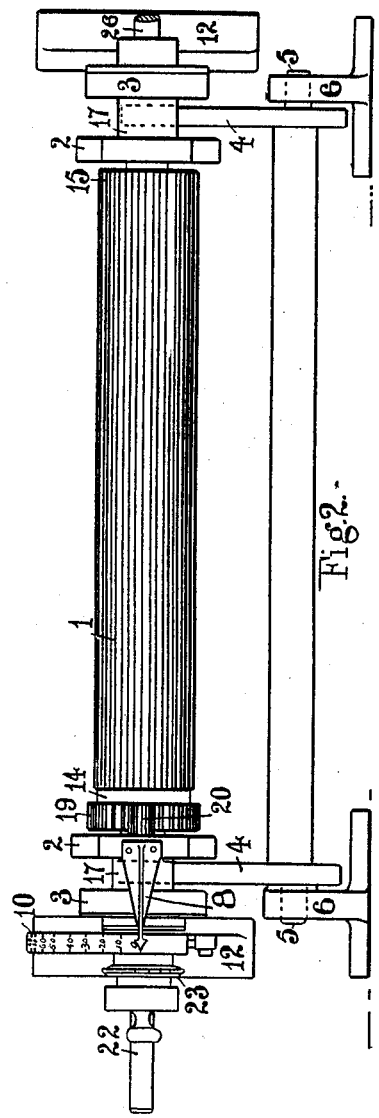
INVENTOR
G. H. Walker.

Sept. 27, 1932.  G. H. WALKER  1,879,721

APPARATUS FOR TESTING THE BRAKES OF VEHICLES

Filed Sept. 22, 1931  5 Sheets-Sheet 2

INVENTOR
G. H. Walker.

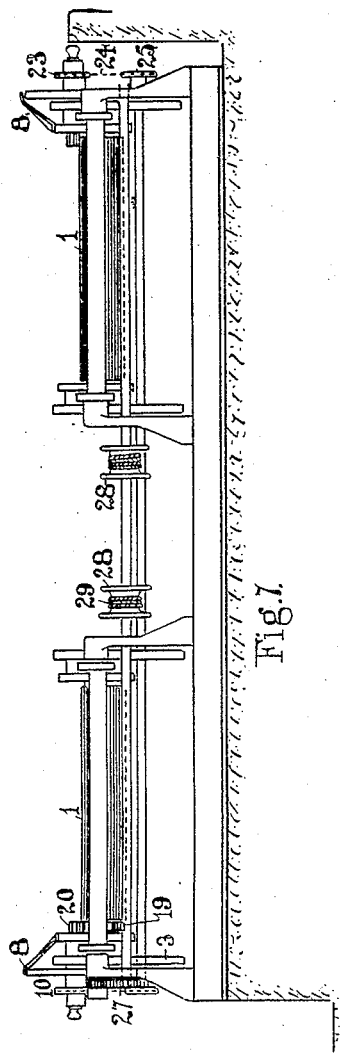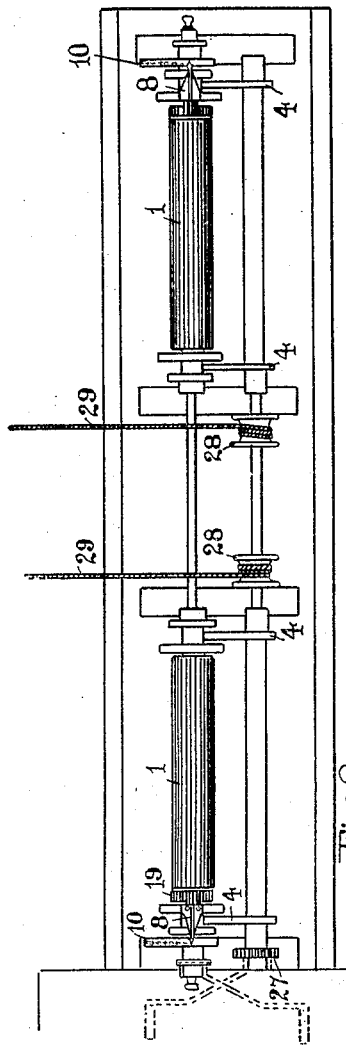

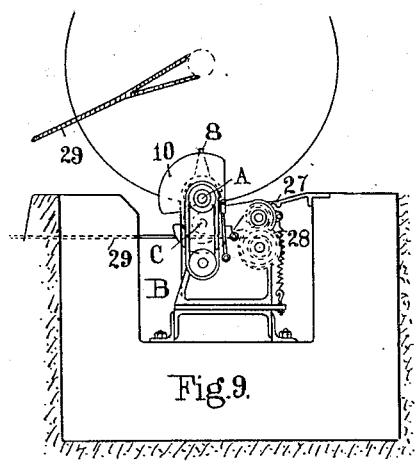
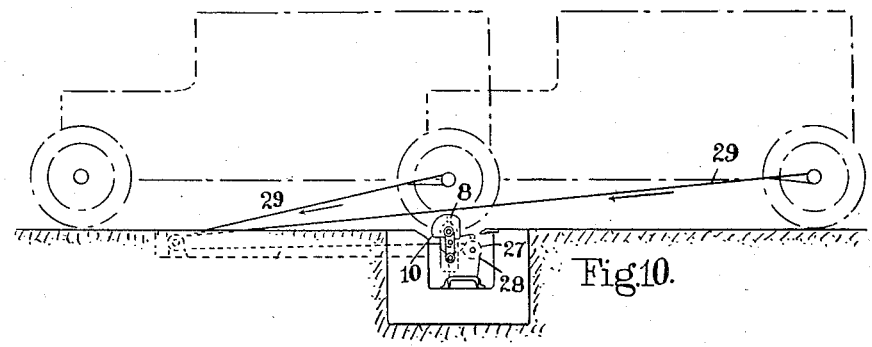
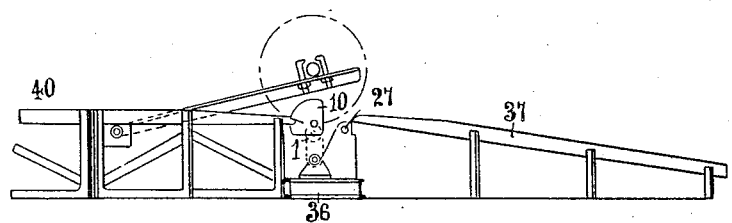

Sept. 27, 1932.    G. H. WALKER    1,879,721
APPARATUS FOR TESTING THE BRAKES OF VEHICLES
Filed Sept. 22, 1931    5 Sheets-Sheet 5
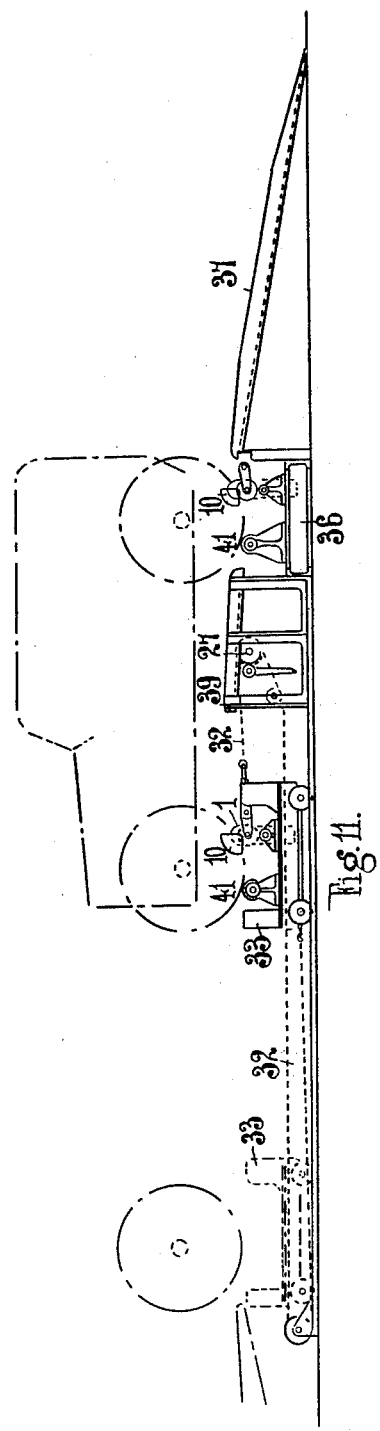
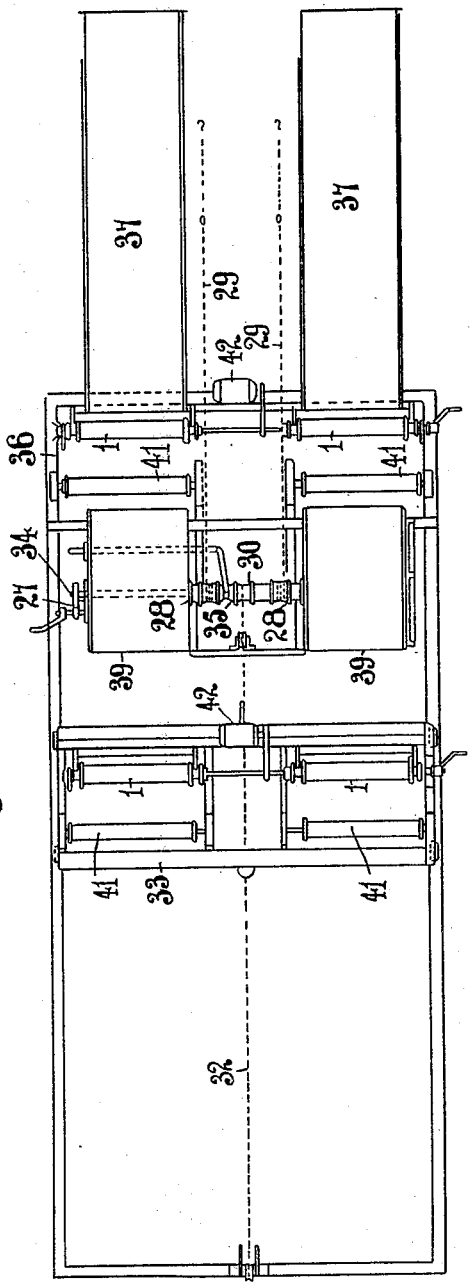
INVENTOR
G. H. Walker Patented Sept. 27, 1932

1,879,721

UNITED STATES PATENT OFFICE

GEORGE HENRY WALKER, OF WORCESTER, ENGLAND, ASSIGNOR TO HEENAN & FROUDE LIMITED, OF WORCESTER, ENGLAND

APPARATUS FOR TESTING THE BRAKES OF VEHICLES

Application filed September 22, 1931, Serial No. 564,310, and in Great Britain October 15, 1930.

This invention relates to devices for testing the brakes of vehicles particularly of vehicles adapted to run upon the road.

Devices for this purpose have been constructed consisting of a series of drums supported in pairs by a framework which may be either fixed to portable, the drums being arranged with their centers on the same horizontal center-line and the space between them forming a well into which the wheels of the vehicle to be tested fall, so that when in position the rim of the wheel makes contact with the rim of both drums. In such device the two drums have been connected together by gearing and means have been provided to apply a twisting moment to the drums, the magnitude of which has been indicated by torque-reaction indicating devices in any well known manner.

In operation the vehicle to be tested is run into position with the wheels resting between pairs of drums arranged in this manner, the brakes are applied preferably by a separate device which indicates the pressure corresponding with that which is exerted by the driver of the vehicle under ordinary running conditions, the magnitude of the pressure being indicated on a dial. The drums are then rotated and the torque reaction read off the indicator after which, by comparison with the weight of the vehicle, the efficiency is calculated. In order that the efficiency may be properly assessed, it is necessary to know what proportion of weight is supported by the wheel of the vehicle undergoing test and this involves a second operation consisting of weight measurement which may be effected either by supporting the wheels of the vehicle in turn upon a weighing machine or alternatively by incorporating in the brake tester a device for indicating the weight supported. The former method is laborious whilst the second involves appreciable expense in constructing the testing device, and both methods occupy time and labour in effecting the measurement of weight.

During the testing operation the vehicle under test tends to move backward or forward under the influence of the forces created, the direction being according to the direction of the turning moment applied to the drums and the testing device tends to move in the opposite direction with an exactly equal and opposite force.

According to the present invention the brake tester is constructed so as to indicate directly the efficiency of the brake, i. e. the ratio between the force exerted tangentially upon the rim of the vehicle to cause it to rotate against the action of the brake and the weight of that portion of the vehicle which is supported by the wheel without it being necessary first to ascertain the latter quantity.

The invention will be described with reference to the accompanying drawings:—

Fig. 1 is a front elevation partly in section of the brake testing apparatus showing the parts in their relative positions before the testing operation is commenced.

Fig. 2 is a plan of Fig. 1.

Fig. 7 is a front elevation of a pair of testing devices, operated by a single source of power, arranged in a pit for testing two wheels simultaneously and also showing means for hauling the vehicle into position on the device.

Fig. 8 is a plan of Fig. 7.

Fig. 9 is an end view thereof.

Fig. 10 is a side elevation on a reduced scale.

Fig. 11 is a side elevation showing four testing units for testing the four wheels of a vehicle simultaneously, two of the units being mounted on a movable trolley for adjustment for vehicles of different wheel base and also illustrating arrangement of ramps for bringing the vehicle into position over the drums of the testing device.

Fig. 12 is a plan of Fig. 11.

Fig. 13 is a side elevation on a larger scale of the ramps.

Figure 3:
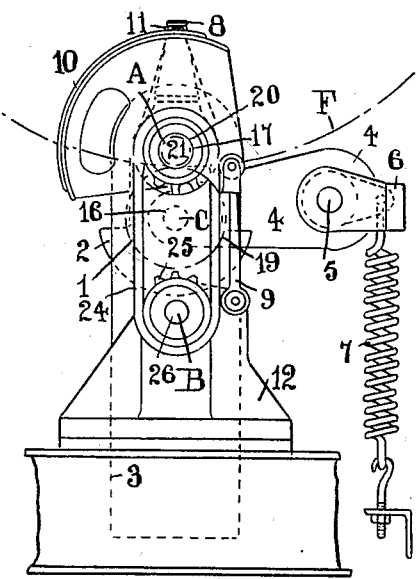
Fig. 3 is an end view of Fig. 1.

The construction of a single brake testing unit is shown in Figs. 1 to 4. It comprises a roller 1 concentrically mounted on a shaft 16 by ball bearings 14 and 15 so that it can freely rotate about the axis of the shaft. The ends of the shafts 16 are affixed to cranks 2 the pivots 17 of which are carried on ball bearings 18 in the upper ends of compensating links 3 which are pivoted to the frame 12 of the device. The ends of the shaft 16 are extended to engage in radius rods 4 mounted on pivots 5 carried by projection 6 affixed to the frame. The radius rods 4 normally lie in an approximately horizontal position and are relatively long so that the shaft 16 and roller 1 can move freely in an approximately vertical direction but are constrained from moving in a horizontal direction. The weight of the roller 1, shaft 16 and other parts are counterbalanced by springs 7 affixed to projections on the radius rods 4.

A gear wheel 19 is affixed to the roller 1 and meshes with a pinion 20 the axis of which coincides with the pivot 17 of the crank 2. The spindle 21 on which the pinion 20 is keyed has a hand lever 22 affixed thereon by which power can be applied to rotate the fluted roller 1. So that power can be transmitted simultaneously to a second testing unit underlying the other wheel of the vehicle on the same axle (i. e. the other front wheel or the other back wheel) a sprocket wheel 23 is affixed on the spindle 21 which drives through a chain 24 a sprocket wheel 25 on a horizontal shaft 26 which extends to the other unit and through a corresponding chain drive rotates a pinion meshing with a gear wheel on the roller.

A pointer 8 is attached to the outer crank 2 and is adapted to move over the rim of a dial or scale 10 mounted on the pivot 17 and prevented from rotation thereon by a link 9. The pointer 8 engages a second or tell tale pointer 11 and when it moves carries this pointer with it to the maximum position on the dial or scale 10 in which position it remains until reset by hand so that it will indicate at the end of a test the maximum movement of the pointer 8.

Figure 5:
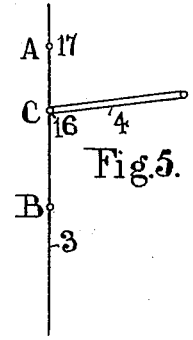
Fig. 5 is a diagrammatic view showing the position of the centers corresponding to the position of the parts in Fig. 3.

Before torque is applied to the gearing 19, 20 by handle 22 the pivotal center A of the crank 2, the center C1 of the drum and the lower center B of the compensating link 3 lie in the same straight line under the influence of that part of the weight of the vehicle which is supported by the drum (see Figs. 3 and 5). Immediately torque is applied, tending to rotate the drum 1 and the wheel F of the vehicle against the resistance of the brake, the reactionary torque tends to turn the crank and its pivot pushes the upper end of the compensating link 3 away from the vertical.

Figure 6:
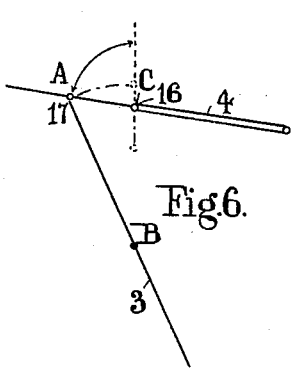
Fig. 6 is a diagrammatic view showing the position of the centers corresponding to the position of the parts in Fig. 5.

In this new position the weight of the vehicle supported by wheel F generates a force, the direction of which passes through the axis C1 of the drum 1 at a horizontal distance from the pivot A of the crank 2 thereby generating a torque which resists and finally balances the tendency of the crank to rotate. The crank 2 then makes with the vertical an angle (see Figs. 4 and 6) the value of which is a measure of the efficiency of the brake. This angle is measured by means of the pointer 8 attached or geared to the crank 2 and moving over the face of the dial 10 the axis of which coincides with the pivot of the crank 2.

In an alternative construction the dial is attached to the crank and the pointer is pivoted upon or attached to the compensating link.

The face of the dial is graduated to show the relation (per cent) between

The force exerted tangentially upon rim of wheel and weight of that portion of vehicle which is supported by drum.

This relation is taken as the efficiency of the brake.

When the brakes are undergoing test they are applied by means of a pedal depressor having an indicator to show the pressure exerted upon the brake pedal.

When the tester is in operation with the drum 1 supporting and turning against the brake resistance of the wheel the pointer 10 thus automatically and instantaneously indicates the brake efficiency expressed as a percentage. Variations in the weight of the vehicle and in the manner in which this weight is distributed over the various wheels do not need to be taken into account so that in contrast to the other systems, it is not necessary to know these weights in order to measure the efficiency of the brakes.

As previously stated the pointer 8 moves a tell tale pointer 11 which remains in the position of the maximum dial reading even after the torque is relieved.

The weight supported by the drum 1 is transferred by the crank 2 to the compensating link 3 which when in any position but the vertical exerts a thrust upon the pivotal axis of the crank the horizontal component of which is such as to modify the angle through which the crank turns under the influence of torque reaction. By suitably proportioning the links and gearing, the graduations of the dial 10 can be rendered approximately uniform while the arc of motion between zero and maximum brake efficiency can be reduced or increased as desired, within practical limits.

The gearing by which the drum is rotated may be of any convenient type such as worm, spur or chain. In the case when the power is generated by motor means, the motor may conveniently be carried upon the pivot of the crank or upon the compensating link. Alternatively, the motor may be portable and applicable to either set of drums.

Figure 4:
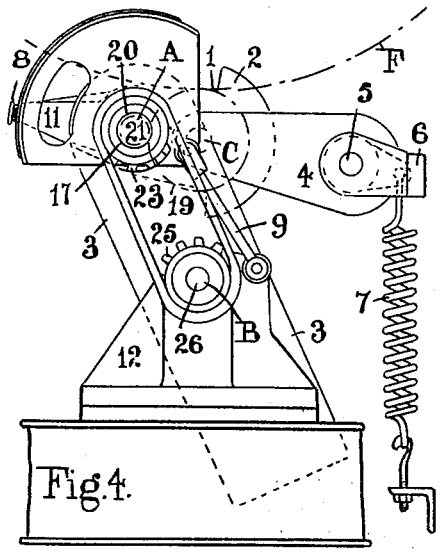
Fig. 4 is an end view showing the parts moved to positions which they may occupy when testing the efficiency of a brake.

The arrangement shown in Figs. 1 and 4 and hereinbefore described in which the drum 1 is driven by a spur wheel 19 intermeshing with a pinion 20 the axis of which coincides with the pivot of the crank 2, is the one at present preferred. The shaft 21 may be driven by a hand lever 22 or by a motor or the cross shaft 26 may be driven by a motor 42 as shown in Fig. 12.

In the form of brake tester shown in Figs. 7 to 10 two drums 1 and their gearing are mounted upon an underframe sunk into excavated foundations with the axis of the drums horizontal. The vehicle is run into position first with the front wheels supported by the drums and after the front brakes have been tested, it is run forward until the rear wheels in turn rest upon the drums for the purpose of testing the rear brakes.

A winch 27 having two drums 28 and ropes 29 serves the purpose of hauling the vehicle into position and holding it there under brake resistance.

Instead of the brake tester being sunk into the ground of floor they may be arranged for floor mountings in which case a platform is provided on which the front or rear wheels of the vehicle may rest while the others are being supported by the drums. Ramps are arranged by which the vehicle can be run into and out of position at either end of the tester.

In the form of brake tester shown in Figs. 11, 12 and 13 the brake tester is duplicated, one set of drums being carried on a fixed frame 36 and the other on a trolley 33 having wheels by means of which its position may be adjusted to accommodate vehicles having differing wheelbase centers.

Winch 27 has three drums, two outer drums 28 and a center drum 30, and the ropes 29 serve the purpose of hauling the vehicle into position and holding it there under brake resistance. The middle drum 30 controls a further rope 32, each end of which is attached to the trolley 33, one end at the rear and one at the front. The shaft 34 of the winch 27 is driven through gearing by hand or motor means, and is connected to the central drum 30 by a jaw clutch 35 which can be put into or out of engagement by striking gear. The two outer drums, however, are permanently keyed to the shaft. A sprag is fitted to the winch to prevent a reversal of rotation of the drums.

Both the fixed frames 36 and the trolley 33 are provided with ramps 37, 38 and a platform 39 is arranged between the frame and the trolley to bridge the space between them when the trolley is in its position nearest to the fixed frame.

In another arrangement (Fig. 13) the space between the trolley and the fixed frame 36 is bridged by girders, 40 one end of which is attached to the fixed frame, and the other supported by a trolley. This is, however, movable in relation to the fixed frame and is capable of lying beneath the girders so that it can take up any position within the limits of which the projecting girder overlaps the trolley. The girder is built in sections which are removable as indicated so that considerable variations in the length of wheel base can be accommodated. A girder section removed from the rear end of the trolley can be replaced at the forward end, or vice versa.

In the foregoing description brake testers have been described having single drums each supporting one wheel of the vehicle. It is to be understood however that each drum 1 may work in conjunction with an idler drum or roller 41 lying parallel with it but spaced apart in a horizontal direction so as to form a gap between the drums in which the wheels of the vehicle may rest as shown in Figs. 11 and 12.

A brake tester construction in accordance with this invention may be utilized for running-in repaired engines or transmission by using the source of power such as the electric motor to drive the wheels of the vehicle through the drums and gearing. The pointer of the indicating device may, in these circumstances, be utilized to indicate the degree of stiffness of the engine or transmission and to show when the running-in process is completed.

What I claim as my invention and desire to protect by Letters Patent is:—

1. Device for testing the brakes of vehicles comprising a drum which supports the wheel the brake of which is being tested, pivoted cranks carrying the drum the pivots of which are parallel with but offset from the axis of the drum, and gearing by means of which a twisting moment can be applied to the drum to rotate it against the resistance of the brake of the wheel, the said gearing being carried by one of the cranks so that when power is applied to rotate the drum the reactionary torque tends to turn the crank about its pivot so that the angle about which the crank is turned is a function of the efficiency of the brake.

2. Device for testing the brakes of vehicles comprising a drum which supports the wheel the brake of which is being tested, pivoted cranks carrying the drum, the pivots of which are parallel with but offset from the axis of the drum, pivoted substantially vertical compensating links in which the pivots of the drum are mounted, the pivotal center of the cranks, the central axis of the drum and the lower center of the compensating links lying in the same straight line under the influence of the part of the weight of the vehicle supported by the wheel before torque is applied to the drums to cause it to rotate and gearing by means of which a twisting moment can be applied to the drum to rotate it against the resistance of the brake, the said gearing being carried by one of the cranks so that when power is applied to rotate the drum against the resistance of the brake, the reactionary torque tends to turn the crank about its pivot so that the angle about which the crank is turned is a function of the efficiency of the brake and owing to the compensating links in which the cranks are pivoted the angle will be approximately proportional to the efficiency of the brake.

3. Device for testing the brakes of vehicles comprising a drum which supports the wheel the brake of which is being tested, pivoted cranks carrying the drum, the pivots of which are parallel with but offset from the axis of the drum, pivoted substantially vertical compensating links in which the pivots of the drum are mounted, the pivotal center of the cranks, the central axis of the drum and the lower center of the compensating links lying in the same straight line under the influence of the part of the weight of the vehicle supported by the wheel before torque is applied to the drums to cause it to rotate, gearing by means of which a twisting moment can be applied to the drum to rotate it against the resistance of the brake, the said gearing being carried by one of the cranks so that when power is applied to rotate the drum against the resistance of the brake, the reactionary torque tends to turn the crank about its pivot so that the angle about which the crank is turned is a function of the efficiency of the brake and owing to the compensating links in which the cranks are pivoted the angle will be approximately proportional to the efficiency of the brake, and means with which the ends of the drum engage so that the axis of the latter will be constrained to move in a substantially vertical direction.

4. Device for testing the brakes of vehicles comprising a drum which supports the wheel the brake of which is being tested, pivoted cranks carrying the drum, the pivots of which are parallel with but offset from the axis of the drum, pivoted substantially vertical compensating links in which the pivots of the drum are mounted, the pivotal center of the cranks, the central axis of the drum and the lower center of the compensating links lying in the same straight line under the influence of the part of the weight of the vehicle supported by the wheel before torque is applied to the drums to cause it to rotate, gearing by means of which a twisting moment can be applied to the drum to rotate it against the resistance of the brake, the said gearing being carried by one of the cranks so that when power is applied to rotate the drum against the resistance of the brake, the reactionary torque tends to turn the crank about its pivot so that the angle about which the crank is turned is a function of the efficiency of the brake and owing to the compensating links in which the cranks are pivoted the angle will be approximately proportional to the efficiency of the brake, and swinging links with which the ends of the drum engage so that the axis of the latter will be constrained to move in a substantially vertical direction.

5. Device for testing the brakes of vehicles comprising a drum which supports the wheel the brake of which is being tested, pivoted cranks carrying the drum, the pivots of which are parallel with but offset from the axis of the drum, pivoted substantially vertical compensating links in which the pivots of the drum are mounted, the pivotal center of the cranks, the central axis of the drum and the lower center of the compensating links lying in the same straight line under the influence of the part of the weight of the vehicle supported by the wheel before torque is applied to the drums to cause it to rotate, gearing by means of which a twisting moment can be applied to the drum to rotate it against the resistance of the brake, the said gearing being carried by one of the cranks so that when power is applied to rotate the drum against the resistance of the brake, the reactionary torque tends to turn the crank about its pivot so that the angle about which the crank is turned is a function of the efficiency of the brake and owing to the compensating links in which the cranks are pivoted the angle will be approximately proportional to the efficiency of the brake, swinging links with which the ends of the drum engage so that the axis of the latter will be constrained to move in a substantially vertical direction, a pointer carried by one of the cranks to indicate the angle which the crank makes with the vertical when the twisting moment is applied to the drum and a dial over which the indicator moves.

6. Device for testing the brakes of vehicles comprising a drum which supports the wheel the brake of which is being tested, pivoted cranks carrying the drum, the pivots of which are parallel with but offset from the axis of the drum, pivoted substantially vertical compensating links in which the pivots of the drum are mounted, the pivotal center of the cranks, the central axis of the drum and the lower center of the compensating links lying in the same straight line under the influence of the part of the weight of the vehicle supported by the wheel before torque is applied to the drums to cause it to rotate, gearing by means of which a twisting moment can be applied to the drum to rotate it against the resistance of the brake, the said gearing being carried by one of the cranks so that when power is applied to rotate the drum against the resistance of the brake, the reactionary torque tends to turn the crank about its pivot so that the angle about which the crank is turned is a function of the efficiency of the brake and owing to the compensating links in which the cranks are pivoted the angle will be approximately proportional to the efficiency of the brake, swinging links, with which the ends of the drum engage so that the axis of the latter will be constrained to move in a substantially vertical direction, a pointer connected to the crank to indicate the angle which the latter makes with the vertical when the twisting movement is applied to the drum and a dial over which the indicator moves and having its axis coinciding with the axis of the crank.

7. Device for testing the brakes of vehicles comprising a drum which supports the wheel the brake of which is being tested, pivoted cranks carrying the drum, the pivots of which are parallel with but offset from the axis of the drum, pivoted substantially vertical compensating links in which the pivots of the drum are mounted, the pivotal center of the cranks, the central axis of the drum and the lower center of the compensating links lying in the same straight line under the influence of the part of the weight of the vehicle supported by the wheel before torque is applied to the drums to cause it to rotate, gearing by means of which a twisting moment can be applied to the drum to rotate it against the resistance of the brake, the said gearing being carried by one of the cranks so that when power is applied to rotate the drum against the resistance of the brake, the reactionary torque tends to turn the crank about its pivot so that the angle about which the crank is turned is a function of the efficiency of the brake and owing to the compensating links in which the cranks are pivoted the angle will be approximately proportioned to the efficiency of the brake, swinging links with which the ends of the drum engage so that the axis of the latter will be constrained to move in a substantially vertical direction, a pointer connected to the crank to indicate the angle which the latter makes with the vertical when the twisting movement is applied to the drum, a dial over which the indicator moves and having its axis coinciding with the axis of the crank, tell tale pointer which is moved by the first pointer to the position of maximum angular movement of the latter so that the maximum angular movement of the crank during a test will be shown when the test is completed, a shaft supported by the pivoted cranks, ball bearings carried on said shaft to support the drum, a spindle concentric with the pivots of the cranks, a pinion mounted on said spindle, a gear wheel on the drum gearing with the pinion on the spindle and means for rotating the spindle to apply the desired turning moment to the drum.

In testimony whereof I have hereunto set my hand this ninth day of September 1931.

GEORGE HENRY WALKER.